Nov. 6, 1962  B. O. AYERS  3,062,039
CHROMATOGRAPHIC ANALYSIS
Filed June 8, 1959
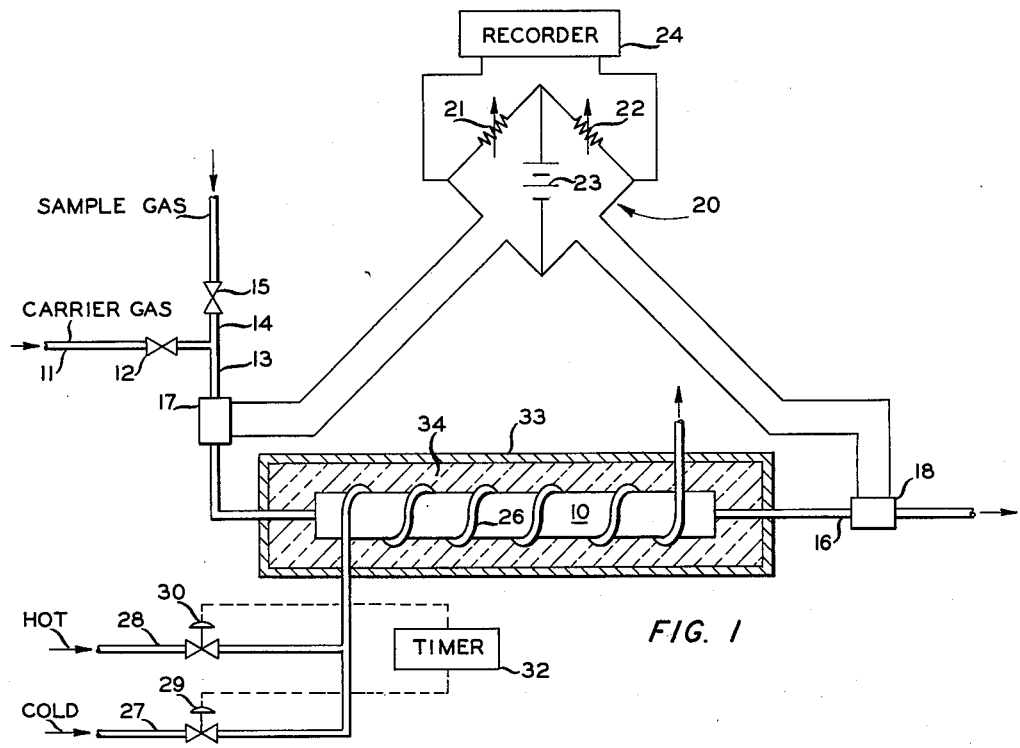
FIG. 1
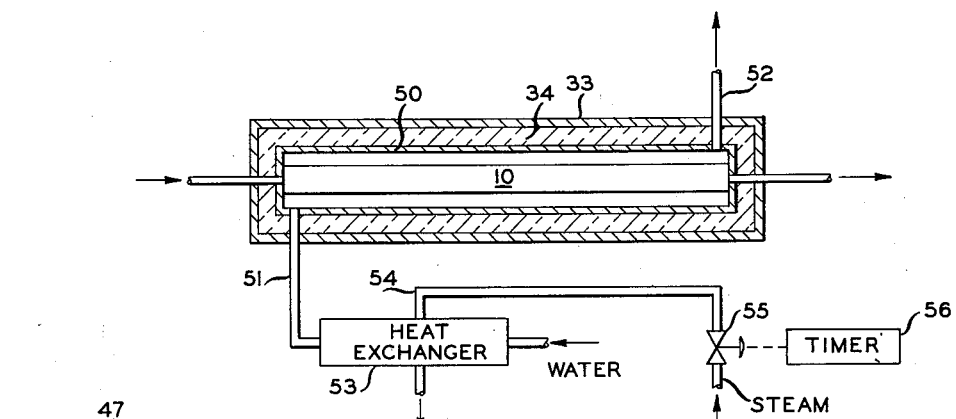
FIG. 2
FIG. 3
INVENTOR.
B. O. AYERS
BY Hudson & Young
ATTORNEYS United States Patent Office 3,062,039
Patented Nov. 6, 1962

3,062,039
CHROMATOGRAPHIC ANALYSIS
Buell O. Ayers, Bartlesville, Okla., assignor to Phillips Petroleum Company, a corporation of Delaware
Filed June 8, 1959, Ser. No. 818,958
3 Claims. (Cl. 73—23)

This invention relates to the analysis of fluid streams to detect constituents or groups of constituents therein.

In various industrial and laboratory operations, there is a need for analytical procedures which are capable of measuring the concentrations of constituents of fluid mixtures. Analyzers employing principles of chromatography are being developed at the present time to meet this need. A chromatographic analyzer comprises a column which is filled with a material that selectively retards the passage therethrough of the constituents of a fluid mixture to be analyzed. When a gas sample to be analyzed is directed through such a column, the individual constituents of the sample appear in the effluent in succession. It has been found that this type of analysis can be made with greater rapidity and with more accuracy by passing some type of heating element along the column in the direction of the gas flow. The temperature gradient established by the heating element facilitates the separation of fluid constituents.

Various types of furnaces have been developed for the purpose of maintaining a desired temperature gradient along a chromatographic column. These furnaces usually comprise some type of heating element which surrounds the column and which is moved along the column. While these furnaces operate in a satisfactory manner, the time required for a complete analysis is often excessive. It is generally not practical to move such a furnace at a rate of speed which is sufficient to provide a complete analysis in the order of a few minutes, for example. A further difficulty results from the fact that a substantial period of time is required to cool the column after the furnace has been moved therepast. This results in a substantial loss of time between subsequent analyses.

In accordance with the present invention it has been found that an improved thermochromatographic analyzer can be provided by surrounding the column with a conduit which is capable of passing a fluid at a high temperature. Suitable means are provided for introducing such a high temperature fluid into the conduit means surrounding the column so that the passage of this fluid through the conduit means heats the column. A cooler fluid can thereafter be directed through the conduit means to reduce the temperature of the column in preparation for a subsequent analysis. By suitable regulation of the rate of the admission of the heating fluid to the conduit means, it is possible to adjust the shape of the temperature gradient which is moved along the column.

Accordingly, it is an object of this invention to provide an improved analyzer for detecting the constituents of fluid mixtures.

Another object is to provide improved means for moving a temperature gradient along a thermochromatographic analyzer column.

Other objects, advantages and features of the invention should be come apparent from the following detailed description which is taken in conjunction with the accompanying drawing in which:

FIGURE 1 is a schematic representation of a first embodiment of the thermochromatographic analyser of this invention.

FIGURE 2 is a schematic representation of a flow control system which can be employed to regulate the temperature of the circulating fluid.

FIGURE 3 is a schematic representation of a second embodiment of the analyzer column heating means of this invention.

Referring now to the drawing in detail and to FIGURE 1 in particular, there is shown a column 10 which is filled with a material that selectively retards the passage therethrough of the constituents of a fluid mixture to be analyzed. This column can be filled with an adsorptive material, such as silica gel, alumina or charcoal, or with an inert solid, such as pulverized brick, which can be coated with a solvent such as hexadecane or benzyl ether. A conduit 11, which has a valve 12 therein, communicates with a conduit 13 which in turn communicates with the inlet of column 10. Conduit 11 is provided to introduce a carrier gas into the column. Examples of suitable carrier gases include helium, hydrogen, nitrogen, air, argon and carbon dioxide. A gas sample to be analyzed is introduced into the system through a conduit 14 which communicates with conduit 13. Conduit 14 has a control valve 15 therein. For some analyses the gas sample alone can be introduced into column 10. If desired, valves 12 and 15 can comprise a rotary sample valve which is capable of introducing predetermined volumes of gas sample into conduit 13 periodically. Alternatively, valves 12 and 15 can be solenoid or pneumatically operated in response to a timer. The effluent from column 10 is removed from the system through a conduit 16.

First and second thermal conductivity cells 17 and 18 are positioned in respective conduits 13 and 16. These thermal conductivity cells preferably comprise temperature sensitive resistance elements which are connected in adjacent arms of a Wheatstone bridge network 20. Network 20 includes balancing resistors 21 and 22 and a voltage source 23 which is connected across first opposite terminals. The second opposite terminals of the bridge network are connected to a recorder 24 which provides an indication of differences between the thermal conductivities of the gases flowing through cells 17 and 18. However, it should be noted that other types of detectors known in the art can be employed in place of the thermal conductivity cells.

Carrier gas alone is initially passed through column 10 to purge the column of any constitutents of a sample gas which may be retained from a previous analysis. A predetermined volume of sample gas is then introduced into the system and is carried through column 10 by the carrier gas. In order to facilitate the separation, a temperature gradient is moved along the column in accordance with this invention to elute the constituents of the sample gas from the column. To this end, a coil 26 of heat conductive material encloses substantially the entire length of column 10. Conduits 27 and 28, which have respective control valves 29 and 30 therein, communicate with the inlet end of conduit 26. Conduits 27 and 28 are adapted to supply fluids, such as water, at different temperatures. The fluid introduced through conduit 28 is at a substantially higher temperature than is the fluid introduced through conduit 27. At the beginning of the analysis cycle, valve 29 is open so that the lower temperature fluid circulates through conduit 26. When it is desired to pass the temperature gradient along column 10, valve 30 is opened and valve 29 is closed so that heated fluid is introduced into conduit 26. Thereafter, the valves are reversed so that the cooler fluid is again circulated. This results in a predetermined volume of liquid at an elevated temperature being passed through conduit 26. The hot fluid progressively increases the temperature of sections of column 10 to establish the desired temperature gradient.

Valves 29 and 30 can advantageously be operated by a suitable timer mechanism 32, This timer can comprise cams which are rotated at a predetermined speed to control the respective valves. By suitable design of the cams, it is possible to regulate the temperature and the volume of the heated fluid in any preselected manner. Column 10 preferably is surrounded by a housing 33 which contains a mass of heat insulating material 34 that tends to maintain a uniform temperature outside the column.

Valves 29 and 30 can be combined in a single valve structure of the configuration shown in FIGURE 2. A housing 35 is provided with inlet ports 36 and 37 which are adapted to be connected to respective conduits 28 and 27 of FIGURE 1. An outlet port 38 is adapted to be connected to conduit 26. Ports 36 and 37 both communicate with port 38 through a valve structure which comprises a pair of valve heads 40 and 41 which are adapted to engage respective valve seats 42 and 43. A rod 44 connects the valve heads to a cam follower 46 which is urged into engagement with a cam 47 by a spring 48. Cam 47 is adapted to be rotate by a motor 49. When the valve heads move downwardly, communication between ports 36 and 38 is established, and when the valves move upwardly, communication between ports 37 and 38 is established. It should thus be evident that cam 47 serves to adjust the temperature of the blended fluid which is introduced into conduit 26. The shape of cam 47 determines the amount of heated fluid that is introduced into conduit 26.

A second embodiment of the thermochromatographic analyzer of this invention is illustrated in FIGURE 3. Column 10 is surrounded by a jacket 50. A conduit 51 introduces a fluid into jacket 50 adjacent the inlet end of column 10 and a conduit 52 removes this fluid from the opposite end of the jacket. A heat exchanger 53 is associated with conduit 51 so that the temperature of water, or other fluid, introduced into jacket 50 can be regulated. Steam, or other heating fluid, is directed through heat exchanger 53 by means of a conduit 54 and has a control valve 55 therein. Valve 55 is regulated by a timer 56 which controls the introduction of steam into the heat exchanger. The passage of steam through the heat exchanger thus elevates the temperature of the water to establish a temperature gradient which is directed along column 10 as the heated water moves through jacket 50.

In view of the foregoing description it should be evident that an improved thermochromatographic analyzer is provided in accordance with this invention. A temperature gradient is moved along the chromatographic column by the passage of heating fluid in heat exchange relationship with the column. This system can readily be adjusted with regard to the amount of heat supplied and the duration of the supply. Furthermore, fluid at a lower temperature can thereafter be circulated along the column to lower the temperature thereof in preparation for a subsequent analysis. This cooler fluid is valuable in that it facilitates desorption of constituents remaining in the column after the analysis cycle.

As a specific example of the operation of this invention, reference is made to a separation of normal hexane from normal heptane. The column contains diisodecyl phthalate on an inert support in the ratio of 4:10 parts by weight. If the carrier gas has a linear velocity through the column of 15 cm./sec. and the temperature gradient moves at a velocity of 1 cm./sec., the equilibrium temperatures for normal hexane and normal heptane are 43° C. and 70° C., respectively. At steady state temperatures, both components travel along the column at the velocity of the moving temperature gradient. If the column is 120 cm. long, the time required for separation is 2 minutes. For a temperature gradient of 2° C./cm., the separation between normal hexane and normal heptane is 13.5 cm. or 13.5 seconds.

While the invention has been described in conjunction with present preferred embodiments, it should be evident that it is not limited thereto.

What is claimed is:

1. The method of analyzing a fluid mixture which comprises passing a fluid at a first temperature in heat exchange relationship with a zone from the inlet to the outlet thereof, said zone selectively retarding passage therethrough of the constituents of a fluid mixture, passing a fluid mixture to be analyzed into the inlet of said zone, thereafter passing a fluid at a second temperature higher than said first temperature in heat exchange relationship with said zone from said inlet to said outlet to cause a wave of a heat front to travel at a desired rate through said zone from said inlet to said outlet, and measuring a property of the effluent from the outlet of said zone during the passage of said fluid last mentioned.

2. The method of analyzing a fluid mixture which comprises passing a fluid at a first temperature in heat exchange relationship with a zone from the inlet to the outlet thereof, said zone selectively retarding passage therethrough of the constituents of a fluid mixture, passing a fluid mixture to be analyzed into the inlet of said zone, thereafter passing a fluid of a second temperature higher than said first temperature in heat exchange relationship with said zone from said inlet to said outlet to cause a wave of a heat front to travel at a desired rate through said zone from said inlet to said outlet, thereafter passing a fluid at a third temperature lower than said second temperature in heat exchange relationship with said zone from said inlet to said outlet, and measuring a property of the effluent from the outlet of said zone during the passage of said fluid of a second temperature higher than said first temperature.

3. A method of analyzing completely in the order of a few minutes repeated samples of a gas or fluid mixture which comprises introducing a sample of a fluid mixture to be analyzed into the inlet of a zone which selectively retards passage therethrough of the constituents of said mixture, passing a fluid at a temperature above the temperature of said zone and at a controlled rate in indirect heat exchange relationship with said zone from said inlet to the outlet of said zone causing a wave of a heat front to travel at a desired rate through said zone from said inlet to said outlet, measuring a property of the effluent from the outlet of said zone during the passage of said fluid last mentioned, discontinuing the flow of said fluid last mentioned, passing a cooler fluid at a rate and at a temperature and in an amount such in indirect heat exchange relationship with said zone from said inlet to the outlet of said zone as to cool said zone to a temperature at which it again selectively retards passage therethrough of constituents of said mixture and then repeating the steps of passing a fluid at a temperature above the temperature of said zone at a controlled rate in heat exchange relationship with said zone from said inlet to the outlet of said zone, and measuring the property of the additional effluent thus obtained, as earlier described in this claim.

References Cited in the file of this patent

UNITED STATES PATENTS

| | | |
|---|---|---|
| 1,661,104 | Barnebey | Feb. 28, 1928 |
| 2,398,818 | Turner | Apr. 23, 1946 |
| 2,591,084 | Martin | Apr. 1, 1952 |

OTHER REFERENCES

Book, "Gas Chromatography," Keulemans, Reinhold Publishing Corp., New York, 1957, page 62, Figs. 3, 4. Copy in Div. 36.

Book, "Gas Chromatography," Keulemans' 2d edition, Reinhold Publishing Corp., N.Y., 1959, page 204. Copy in Division 36.